Feb. 5, 1929.
J. M. CUSTENBORDER
HYDRAULIC BRAKE CYLINDER
Filed March 17, 1927
1,701,297
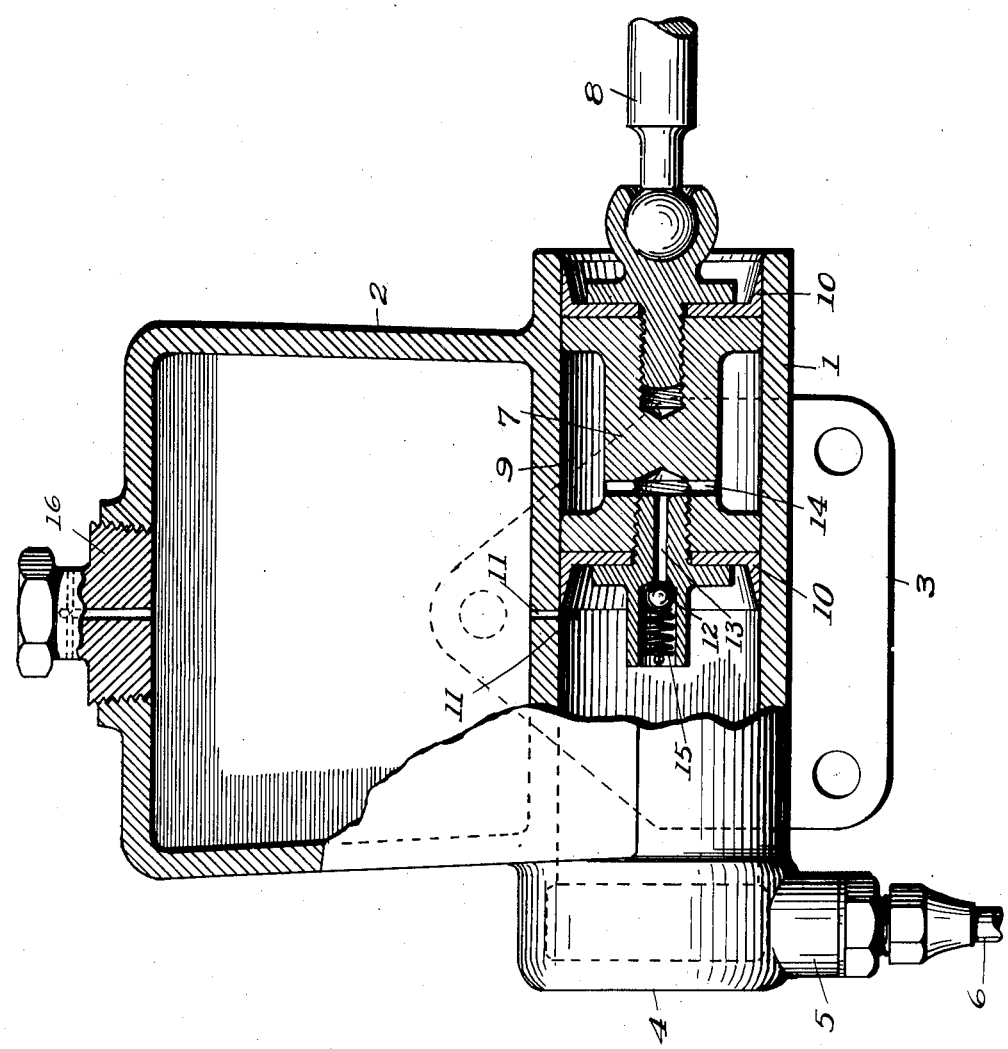
Inventor
John M. Custenborder
Atty.

Patented Feb. 5, 1929.

1,701,297

UNITED STATES PATENT OFFICE.

JOHN M. CUSTENBORDER, OF PEORIA, ILLINOIS.

HYDRAULIC BRAKE CYLINDER.

Application filed March 17, 1927. Serial No. 176,164.

My invention relates to devices for furnishing fluid under pressure for use in connection with the so called hydraulic brakes used on automobiles and is concerned primarily with that part of the brake mechanism usually called the master cylinder.

One object of my invention is the provision of a master cylinder in combination with a fluid supply reservoir and an arrangement of parts and passages whereby any excess of fluid in the braking system, due to expansion or otherwise, may be returned to the reservoir during inactive periods.

Another object of my invention is the provision of a chambered elongated piston and a one-way fluid passage from the chamber of the piston to the pressure side thereof and the provision of a passage from the fluid reservoir to the chamber of the piston when the piston is in active position, whereby the supply of fluid in the cylinder and the braking system may be replenished if there is a deficiency caused by leakage or otherwise.

Other objects of my invention will appear and be described in the specification.

The novelty of my invention will be hereinafter more fully set forth and specifically pointed out in the claims.

In the accompanying drawing I have shown one form of device embodying my invention, the drawing being partly in section to better illustrate the interior parts and arrangements.

While I have shown and will presently describe one form of device embodying my invention, I do not limit myself to the details of construction or the arrangement of parts shown or described, but avail myself of all changes and modifications which may be within the scope of my invention, and the claims hereto appended.

In the drawing, 1 represents the cylinder which may be made of a cast material such as iron, and which is provided with a suitable fluid reservoir 2 and supporting lug or pad 3, the cylinder being closed at one end as at 4 and provided with an outlet 5 to which the pipe 6 is connected, the latter leading to the usual or any suitable brake applying device adjacent to and co-operating with the wheels of the vehicle.

An elongated piston 7 is mounted within the cylinder 1 and is reciprocated therein by any suitable connecting rod 8 which ordinarily leads to the brake pedal. The piston 7 is reduced in diameter throughout its central portion to form a chamber 9, the piston carrying a packing cup 10 at each end thereof, these cups being preferably arranged and mounted as shown, and the piston being shown in proper position during the inactive periods or periods when the brakes are not being applied.

A series of small passages 11 extend from the interior of the cylinder 1 to the interior of the reservoir 2 and are located as shown so that when the piston 7 is in the inactive position, these passages 11 establish communication between the reservoir and the interior of the cylinder between its closed end and the cup 10, these passages 11 being located so that the first part of the movement of the piston 7 toward the closed end of the cylinder, this movement being the pressure or brake applying movement of the piston, carries the cup 10 across these passages 11 and closes them. A continuation of the movement of the piston establishes communication between the chamber 9 of the piston and the reservoir 2, through the passages 11.

There is a fluid passage from the chamber 9 of the piston 7 to the space between the piston 7 and the closed end 4 of the cylinder and this passage is provided with a check valve 12 which is arranged to permit a flow from the chamber 9 through the passages 13 and 14 but not in the reverse direction, the check valve 12 being held to its seat by a light spring 15.

Any suitable vented plug 16 is used to close the filling opening in the reservoir 2, this plug being vented to prevent the formation of either a pressure or a vacuum in the reservoir.

The operation of the device is as follows:

Assuming the device mounted on an automobile, the tube 6 connected with the proper brake operating devices, the connecting rod 8 connected to the brake pedal, and the braking system filled with fluid and the reservoir 2 at least partly filled with fluid, which is usually a mixture of glycerine and alcohol, the parts being so connected that when the brake pedal is in release position, the piston 7 is in the position shown in the drawing. Should there be any expansion of the fluid in the braking system, caused by an increase in temperature or from any other cause, the fluid will find its way through the passages 11 into the reservoir 2 and if, later there should be contraction of the fluid the same passage will act to refill the system from the reservoir. When it is desired to apply the brakes, the piston 7 is forced toward the closed end 4 of the cylinder 1, the first part of the movement carrying the cup 10 over the passages 11 and closing them, after which a further movement of the piston forces the fluid through the tube 6 to the brake applying device to accomplish the application of the brakes. If any of the fluid should be lost through leakage or otherwise during the brake application, the return stroke of the piston 7 will permit a flow of fluid through the passages 13 and 14 to replenish the loss, it being noted that the passage 14 communicates with the chamber 9 formed in the piston, which in turn communicates with the passage 11 when the piston moves toward the closed end 4 of the cylinder, it being understood that the spring 15 is preferably made light enough so that it does not require much of a vacuum to open the valve 12, this valve being arranged so that it is always closed when the fluid in the cylinder is under pressure.

Having thus fully described my invention, I claim:

1. In a hydraulic brake the combination of a cylinder, a connection leading from the cylinder to brake operating mechanisms, a reservoir, a chambered elongated piston in the cylinder, means for moving the piston, a fluid passage communicating between the cylinder and the reservoir and adjacent the pressure end of the piston when the latter is in release position, and a check valve for permitting a flow of fluid from the chamber of the piston to the pressure side thereof but restraining a flow in the reverse direction.

2. In a hydraulic brake the combination of a cylinder, a connection leading from the cylinder to brake applying devices, a reservoir carried by the cylinder, an elongated piston in the cylinder and having a reduced portion forming a chamber, means for moving the piston within the cylinder, a fluid passage between the cylinder and the reservoir and adjacent the pressure end of the piston when the latter is in release position, said passage also communicating with the chamber of the piston when the latter is in a position toward pressure applying position, a passage between the chamber of the piston and the pressure side thereof, and a check valve in said passage for permitting a flow of fluid from the chamber to the pressure side of the piston.

JOHN M. CUSTENBORDER.